(12) United States Patent
Kalam et al.

(10) Patent No.: US 12,404,444 B2
(45) Date of Patent: Sep. 2, 2025

(54) METHOD TO REDUCE ADSORPTION OF CATIONIC SURFACTANTS ON CARBONATE ROCKS USING METHYLENE BLUE

(71) Applicant: KING FAHD UNIVERSITY OF PETROLEUM AND MINERALS, Dhahran (SA)

(72) Inventors: Shams Kalam, Dhahran (SA); Sidqi Ahmad Mohammad Abu-Khamsin, Dhahran (SA); Shirish Liladhar Patil, Dhahran (SA); Muhammad Shahzad Kamal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/364,604

(22) Filed: Aug. 3, 2023

(65) Prior Publication Data
US 2025/0043170 A1    Feb. 6, 2025

(51) Int. Cl.
C09K 8/584    (2006.01)
E21B 43/27    (2006.01)

(52) U.S. Cl.
CPC .............. *C09K 8/584* (2013.01); *E21B 43/27* (2020.05); *C09K 2208/10* (2013.01)

(58) Field of Classification Search
CPC ..... C09K 8/584; C09K 2208/10; E21B 43/26; E21B 43/16
See application file for complete search history.

(56) References Cited

U.S. PATENT DOCUMENTS

| | | | |
|---|---|---|---|
| 10,266,751 B2 | 4/2019 | Bittner et al. | |
| 11,225,857 B2 | 1/2022 | Bittner et al. | |
| 11,390,794 B2 | 7/2022 | Bittner et al. | |
| 11,512,045 B2 | 11/2022 | Hussain et al. | |
| 2010/0314105 A1* | 12/2010 | Rose | E21B 49/008 |
| | | | 166/250.1 |
| 2011/0161010 A1* | 6/2011 | Rickman | G01N 13/02 |
| | | | 73/64.48 |

(Continued)

OTHER PUBLICATIONS

Shams Kalam, et al., "Adsorption Characteristics of a Cationic Gemini Surfactant on Carbonate Outcrops: Adsorption Reduction Using Methylene Blue", Energy Fuels, vol. 37, Issue 7, Mar. 16, 2023, pp. 5013-5024 (Abstract only).

*Primary Examiner* — Silvana C Runyan
(74) *Attorney, Agent, or Firm* — Oblon, McClelland, Maier & Neustadt, L.L.P.

(57) ABSTRACT

A method of enhanced oil recovery in a carbonate rock formation including injecting a mixture into the carbonate rock formation containing an oil composition and extracting the oil composition from the carbonate rock formation. The mixture includes 90-99.99 vol % of an aqueous solution and 0.01-10 vol % of a gemini cationic surfactant based on a total volume of the mixture and 1-2000 parts per million (ppm) of methylene blue, based on a total weight of the mixture. During the injecting at least a portion of the gemini cationic surfactant is adsorbed onto the carbonate rock formation, and at least 50% less by volume of the gemini cationic surfactant adsorbs onto the carbonate rock formation compared to a method under the same conditions but without the methylene blue.

18 Claims, 11 Drawing Sheets

(56) References Cited

U.S. PATENT DOCUMENTS

| | | | |
|---|---|---|---|
| 2011/0214488 A1* | 9/2011 | Rose | E21B 47/11 |
| | | | 977/932 |
| 2019/0224361 A1* | 7/2019 | Roy | A61L 12/102 |
| 2020/0239762 A1 | 7/2020 | Bittner et al. | |
| 2020/0325381 A1* | 10/2020 | Kamal | C09K 8/24 |
| 2021/0238472 A1* | 8/2021 | Kamal | C09K 8/602 |

* cited by examiner

METHOD TO REDUCE ADSORPTION OF CATIONIC SURFACTANTS ON CARBONATE ROCKS USING METHYLENE BLUE

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to an oil recovery method, particularly to a method of extracting oil from carbonate rocks using a mixture of a gemini surfactant and methylene blue.

Description of the Related Prior Art

The description of the related prior art provided herein is for the purpose of generally presenting the context of the disclosure. Work of the presently named inventors, to the extent described in this background section, as well as aspects of the description which may not otherwise qualify as prior art at the time of filing, are neither expressly nor impliedly admitted as prior art against the present invention.

Oil recovery is a multi-step process to obtain oil and gas from a reservoir. Typically, the production rate varies over the lifecycle of a reservoir or a well. Therefore, for optimal oil recovery, various techniques and technologies are employed across several phases depending on the age of the well, formation characteristics, and the cost of operation. Thus, oil recovery methods are grouped into three main categories: primary, secondary, and tertiary processes. In primary recovery, the oil is produced by the natural reservoir energy. After the primary recovery, the secondary stage is introduced, which involves water flooding, pressure maintenance, and gas injection. The tertiary process or enhanced oil recovery (EOR) is employed when crude oil from an oil field is otherwise difficult to extract using primary and secondary techniques.

Studies have shown that carbonate reservoirs contain about 60% of the remaining oil reserves worldwide. However, carbonate rocks are heterogenous, naturally fractured, and categorized as either oil-wet or mixed wet. Rocks can be classified as water-wet, mixed-wet or oil-wet. When the rock is water-wet, water is preferentially in contact with the mineral when oil is the surrounding phase. The rock is said to be oil-wet when oil is the liquid in contact with the rock.

The state in between is called intermediate- or mixed-wet. Moreover, many carbonate rocks show minimal permeability. Because of the complexities associated with carbonate rocks, incremental oil recovery by water flooding of carbonate reservoirs is usually low. Therefore, EOR methods are often necessary for oil recovery from carbonate reservoirs.

EOR methods have been categorized into three techniques: gas injection, thermal injection, and chemical injection. Gas injection uses gases such as natural gas, nitrogen, or carbon dioxide to displace oil. Thermal injection uses heat to heat the crude oil thereby reducing its viscosity and/or vaporizing part of the oil. Chemical injection can involve the use of chemicals to increase the effectiveness of waterflooding. Overall, the chemical EOR methods have shown better results than thermal and gas flooding EOR methods.

The currently utilized chemical EOR processes involve injecting specific liquid chemicals that effectively displace oil because of their phase-behavior properties, decreasing the interfacial tension (IFT) between the displacing liquid and oil. The popular chemicals used include surfactants, polymers, and alkaline solutions. However, the monometallic transitional metal catalysts often used in the process suffer from deactivation, metal particle sintering, and regeneration of the catalysts. Although surfactants are beneficial as EOR agents, they pose several challenges, such as compatibility with high temperature and high salinity (HTHS) environments and cost. On the other hand, a major concern associated with surfactant flooding is the loss of surfactant by adsorption onto the rock surface, which considerably reduces the process' efficiency and economic viability. Another significant problem associated with the oil recovery from carbonate rocks is the rock's surface charge density, which changes with the solution pH. Thus, achieving a pH at which there is no net charge on the rock surface becomes important in choosing the type of surfactant that can quickly help achieve the no net charge on the surface of the rock.

However, despite recent advances, the drawbacks of current EOR methods, as discussed above, indicate that there is still a need for an improved method for enhanced oil recovery. Specifically, the method should overcome the problems associated with the permeability of the carbonate reservoirs, significantly lower the IFT and be achieved at a low critical micelle concentration to ensure maximum oil and gas recovery. Furthermore, the method should overcome the above problems at an economical cost for rapid industrial adaptability. Accordingly, one object of the present disclosure is to provide a cost-efficient and economically viable method for overcoming the drawbacks of the current state of the EOR procedures.

SUMMARY

In an exemplary embodiment, a method of enhanced oil recovery in a carbonate rock formation is disclosed. The method includes injecting a mixture into the carbonate rock formation comprising an oil composition. The method includes extracting the oil composition from the carbonate rock formation. The mixture includes 90-99.99 vol % of an aqueous solution and 0.01-10 vol % of a gemini cationic surfactant based on a total volume of the mixture and 1-2000 parts per million (ppm) of methylene blue, based on a total weight of the mixture. During the injecting at least a portion of the gemini cationic surfactant is adsorbed onto the carbonate rock formation, and wherein at least 50% less by volume of the gemini cationic surfactant adsorbs onto the carbonate rock formation compared to a method under the same conditions but without the methylene blue.

In some embodiments, the carbonate rock formation is at least one selected from the group consisting of limestone and dolomite.

In some embodiments, the carbonate rock formation is limestone and includes sodium, magnesium, aluminum, silicon, potassium, calcium, titanium, manganese, iron, strontium, and niobium.

In some embodiments, the carbonate rock formation is dolomite and includes magnesium, aluminum, silicon, potassium, calcium, titanium, vanadium, chromium, manganese, iron, copper, strontium, and niobium.

In some embodiments, the carbonate rock formation further includes at least one impurity selected from the group consisting of quartz, montmorillonite, illite, kaolinite, alunite, pyrite, anorthite, halite, and gypsum.

In some embodiments, the carbonate rock formation includes 0.1-50 wt. % of the at least one impurity, based on a total weight of the carbonate rock formation.

In some embodiments, the aqueous solution includes least one ion selected from the group consisting of chloride, sodium, sulfate, magnesium, calcium, and potassium.

In some embodiments, the aqueous solution includes 1-200,000 ppm of the at least one ion, based on a total mass of the aqueous solution.

In some embodiments, the mixture has a temperature ranging from 70 to 110° C. during the injecting.

In some embodiments, the mixture consists of the aqueous solution, the gemini cationic surfactant, and methylene blue.

In some embodiments, the gemini cationic surfactant is of formula (II)

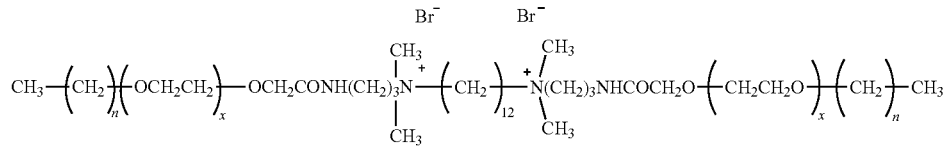

(II)

where n is 1 to 20 and x is 1 to 20.

In some embodiments, n is 12 and x is 12.

In some embodiments, the gemini cationic surfactant has a critical micelle concentration of 10-20 ppm.

In some embodiments, 0.1-10 milligrams (mg) of methylene blue is injected per kilogram (kg) of the carbonate rock formation.

In some embodiments, the mixture does not include a base.

In some embodiments, the mixture does not corrode the carbonate rock formation.

In some embodiments, the methylene blue is in a form of spherical nanoparticles have an average size of 10-50 nanometers (nm).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
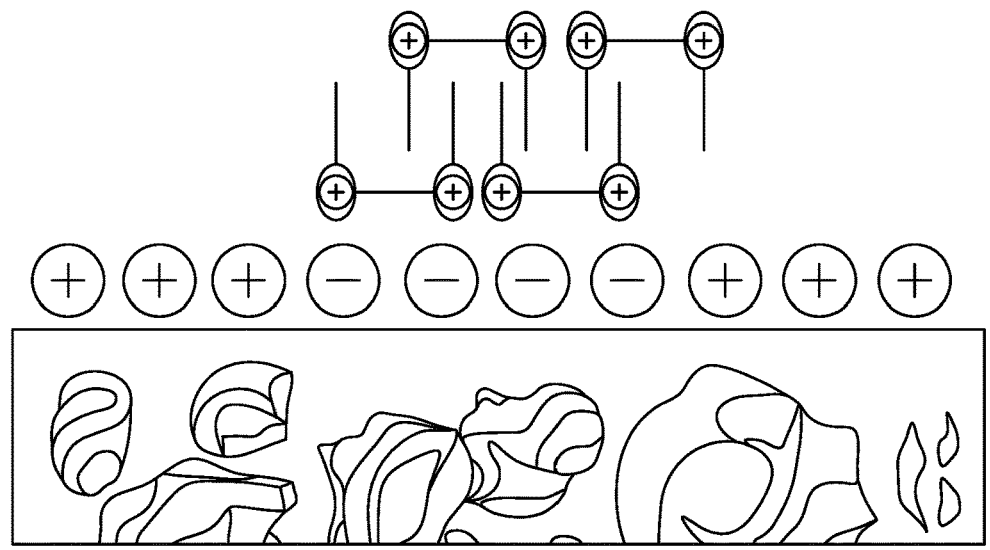
FIG. 1A-FIG. 1B depict adsorption reduction mechanisms using methylene blue in carbonates, according to certain embodiments.

When describing the present disclosure, the terms used are to be construed in accordance with the following definitions, unless a context dictates otherwise. Embodiments of the present invention will now be described more fully hereinafter with reference to the accompanying drawings wherever applicable, in which some, but not all embodiments of the disclosure are shown.

Further, as used herein, the use of singular includes the plural and the words 'a', and 'an' includes 'one' and means 'at least one' unless otherwise stated in this application.

Furthermore, the terms "approximately", "approximate", "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

The use of the terms "include," "includes", "including," "have," "has," or "having" should be generally understood as open-ended and non-limiting unless specifically stated otherwise.

The term "point of zero charge" or "PZC" refers to the pH at which the net charge of the total particle surface (i.e., absorbent's surface) is equal to zero.

The term "critical micelle concentration" or "CMC" refers to a specific concentration of a surfactant at which micelle formation is first seen in a solution. The CMC would result in micelle formation of all the surfactants added once the specific concentration of the surfactant is achieved.

As used herein, the term "water injection" or "waterflooding" refers to a method of oil recovery in which water or a fluid is injected into a petroleum reservoir to sweep and displace mobile oil from a subterranean geological formation. The water injected increases pressure within the reservoir, replenishing the natural reservoir pressure that has been previously depleted in primary recovery, and physically sweeps the displaced mobile oil to adjacent production wells. Generally, the water or fluid used in a waterflooding process is taken from nearby water sources, and is usually natural seawater, fresh water, produced water (byproduct of the oil industry), aquifer water, river water, artificial saline water or brine.

"Hydrocarbons", "petroleum", "crude oil", "oil", or "oil composition" may be used interchangeably to refer to carbonaceous material originating from subterranean sources as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

As used herein, the terms "reservoir", "oil reservoir" and "petroleum reservoir" refer to a component of a petroleum system (i.e. hydrocarbon or petroleum-generating and storing geologic system) that is composed of a subsurface body of rock formations having sufficient porosity and permeability to store and transmit fluids. Sedimentary rocks are the most common reservoir rocks because they have more porosity than most igneous and metamorphic rocks and form under temperature conditions at which hydrocarbons can be preserved. Depending on the type of sedimentary rock, reservoirs can be classified as carbonate reservoirs having predominantly limestones, and sandstone reservoirs having primarily siliclastic rocks and clay. In one embodiment, the reservoir is a carbonate reservoir, or a sandstone reservoir. In a preferred embodiment, the reservoir is a carbonate reservoir. Alternatively, the reservoir is a tight shale reservoir formed by hydraulic fracturing.

The term "carbonate rock formation" or "carbonate reservoir" refers to any rock which has a carbonate mineral presence unless otherwise expressly disclosed.

As used herein, the terms "bore" and "wellbore" refer to a drilled hole or borehole of a reservoir, including the open hole or uncased portion of the well. In some embodiments, a borehole refers to the inside diameter of the wellbore wall, the rock face that bounds the drilled hole. Depending on the embodiment, a wellbore can be used for injection, production, or both.

Aspects of the present disclosure are directed towards improving the efficiency of surfactant flooding for enhanced oil recovery (EOR) by reducing the adsorption of the surfactant on the surface of the rock. The present disclosure describes a method of surfactant flooding to improve oil recovery by lowering the interfacial tension and/or altering the reservoir rock's wettability. The flooding includes methylene blue which reduces an amount of surfactant losses caused by adsorption on the surface of the rock.

Figure 2:
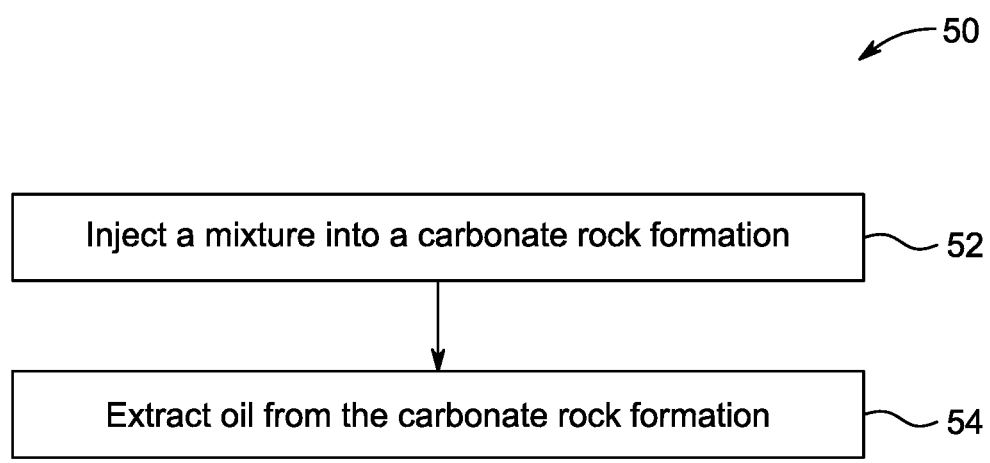
FIG. 2 is a schematic flow chart of a method of enhanced oil recovery in a carbonate rock formation, according to certain embodiments.

FIG. 2 illustrates a flow chart of a method 50 of method of enhanced oil recovery in a carbonate rock formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a mixture into the carbonate rock formation also referred to as a carbonate reservoir. The mixture containing an enhanced oil recovery formulation used herein may substantially increase the yield of hydrocarbons from underground reservoirs when injected and are particularly useful for increasing yield of hydrocarbons from carbonate reservoirs.

In some embodiments, the mixture has a temperature of about 70, about 75, about 80, about 90, about 95, about 100 to about 105° C. or about 110° C. during the injecting process. Injection pressures and flow rates of the mixture may be kept constant or varied. In one embodiment, the injection pressure of the mixture is up to 5,000 psi, preferably 50-3,000 psi, preferably 100-1,000 psi. In a related embodiment, the injection flow rate of the mixture is 0.1-50 mL/min, preferably 0.5-20 mL/min, preferably 1-10 mL/min. In one or more embodiments, the reservoir has a temperature of 50-300° C., 75-250° C., 100-200° C., or 150-180° C. In a related embodiment, the reservoir has a pressure of 100-3,000 psi, 200-2,500 psi, 400-2,000 psi, 800-1,500 psi, or 1,000-1,200 psi.

The mixture comprises an aqueous solution, a gemini cationic surfactant, and methylene blue. In some embodiments, the mixture includes preferably about 91, about 92, about 93, about 94, about 95, about 96, about 97, about 98, and about 99 vol. % of the aqueous solution. In a preferred embodiment, the mixture includes up to about 99.9 vol. % of the aqueous solution based on the total volume of the mixture.

In some embodiments, the aqueous solution includes at least one ion selected from the group consisting of chloride, sodium, sulfate, magnesium, calcium, bicarbonate, and potassium. In some examples, the aqueous solution includes 1-400,000 ppm of at least one ion, based on the total mass of the aqueous solution. In one embodiment, the aqueous solution is saline having a salinity of 10,000 ppm to 400,000 ppm, preferably 50,000 ppm to 300,000 ppm, more preferably 100,000-200,000 ppm. In a preferred embodiment, the aqueous solution is seawater having a salinity of 40,000 ppm to 80,000 ppm, preferably 50,000 ppm to 70,000 ppm, more preferably 55,000 ppm to 60,000 ppm. In one embodiment, the seawater is natural seawater or simulated seawater having sodium present at a concentration of 5-40 g/L, 10-30 g/L, or about 18 g/L, calcium present at a concentration of 0.25-2 g/L, 0.5-1.5 g/L, or about 0.7 g/L, magnesium present at a concentration of 0.5-4 g/L, 1-3 g/L, or about 2 g/L, sulfate present at a concentration of 2-8 g/L, 3-6 g/L, or about 4 g/L, chloride at a concentration of 15-60 g/L, 20-40 g/L, or about 30 g/L, and bicarbonate present at a concentration of 0.05-0.2 g/L, 0.08-0.15 g/L, or about 0.1 g/L, each relative to a total volume of the aqueous solution. In certain embodiments, when the aqueous solution is natural seawater, the solution may further contain microbial components and other organic pollutants that can be optionally removed prior to the oil recovery process. In another preferred embodiment, the aqueous solution is formation water having a salinity of 100,000 ppm to 400,000 ppm, preferably 150,000 ppm to 300,000 ppm, more preferably 200,000 ppm to 250,000 ppm. In one embodiment, the formation water is natural formation water or simulated formation water having sodium present at a concentration of 30-100 g/L, 50-80 g/L, or about 60 g/L, calcium present at a concentration of 8-40 g/L, 15-30 g/L, or about 20 g/L, magnesium present at a concentration of 1-5 g/L, 2-4 g/L, or about 2.5 g/L, sulfate present at a concentration of 0.1-1 g/L, 0.2-0.6 g/L, or about 0.4 g/L, chloride at a concentration of 60-200 g/L, 100-160 g/L, or about 130 g/L, and bicarbonate present at a concentration of 0.1-1 g/L, 0.2-0.5 g/L, or about 0.4 g/L, each relative to a total volume of the solution.

In an embodiment, the at least one ion is from a monovalent or divalent salt. Examples of monovalent salts include but are not limited to NaCl, and KCl. Examples of divalent salts include but are not limited to $CaCl_2$, and $MgCl_2$. In a preferred embodiment, the at least one ion is from a divalent salt, i.e. preferably calcium, magnesium, and chloride. While not wishing to be bound to a single theory, as shown in FIG. 1B, an electric double layer is formed at the adsorbent and adsorbate interface, created by the unequal distribution of electrical charges. The electric double layer between microparticles on the rock surface is expanded at low salinity conditions. Such expansion lowers the interfacial energy between fluid and rock, reducing surfactant adsorption on the rock surface. With the increase of the concentration of a monovalent salt, the electrical double layer on the surface of the adsorbent is assumed to be compressed thereby increasing adsorption of the surfactant. However, the higher the concentration of divalent salts in the surfactant solution, the more reduction of adsorption takes place. This is due to the increased rock surface charge by lattice ions ($Ca^{2+}$ and $Mg^{2+}$), consequently, repulsive forces between the surfactant and the rock surface increase, leading to adsorption reduction.

In an embodiment, the mixture includes a gemini cationic surfactant. Gemini surfactants contain two hydrophilic head groups and two hydrophobic tails linked by a spacer at the head groups or close to them. When both hydrophobic parts are the same and hydrophilic groups are identical, then the gemini surfactant forms a symmetric structure. The spacer can be either hydrophobic or hydrophilic. A general structure for the gemini surfactant is shown in Formula (I) below.

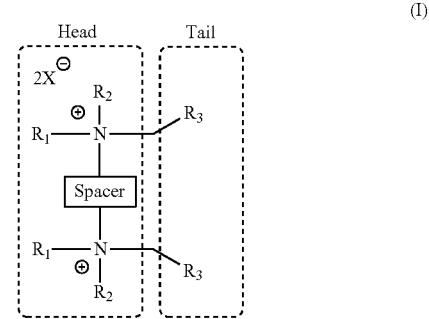

(I)

In Formula (I), X is Cl, Br, or I. $R_1$ and $R_2$ are each independently an alkyl group with 1-10 carbon atoms, preferably 2-9, 3-8, 4-7, or 5-6 carbon atoms. $R_3$ is a hydrophobic tail or chain having 1-100 carbon atoms in the chain, preferably 5-80, 10-50, or 15-30 carbon atoms and may include functional groups such as alkenes, alkynes, ketones, ethers, esters, aldehydes, amides, and amines. The atoms in the hydrophobic chain may be a straight or branched, or in a cyclic structure that is aromatic or non-aromatic. The spacer includes 1-20 carbons in a chain and may include functional groups such as ketones, ethers, esters, aldehydes, alcohols, sulfides, alkynes, amides, and amines. The atoms in the spacer may be in a straight or branched chain, or in a cyclic structure that is aromatic or non-aromatic.

In preferred embodiments (see also FIG. 1B), the gemini cationic surfactant is of formula (II) below.

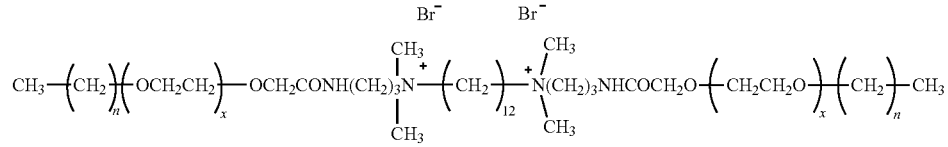

(II)

In Formula (II), n is 1 to 20, and x is 1 to 20. The spacer as depicted in Formula (II) is a carbon chain with 12 carbon atoms, however one of ordinary skill in the art would recognize that the length could be modified from 1 to 20 carbon atoms, preferably 3-17, or 5-15 carbon atoms. The counter ion or X in Formula (II) is Br, however one of ordinary skill in the art would recognize that X could be modified to be Cl or I. The hydrophobic tails include a carbon chain with functional groups such as ethers and amides.

In some embodiments, n is preferably 1, preferably 2, preferably 3, preferably 4, preferably 5, preferably 6, preferably 7, preferably 8, preferably 9, preferably 10, preferably 11, preferably 12, preferably 13, preferably 14, preferably 15, preferably 16, preferably 17, preferably 18, preferably 19, preferably 20 and x is preferably 1, preferably 2, preferably 3, preferably 4, preferably 5, preferably 6, preferably 7, preferably 8, preferably 9, preferably 10, preferably 11, preferably 12, preferably 13, preferably 14, preferably 15, preferably 16, preferably 17, preferably 18, preferably 19, preferably 20. In some preferred embodiments, n is 12 and x is 12.

In an embodiment, the mixture includes 0.01-10 vol % of a gemini cationic surfactant, based on the total volume of the mixture, preferably 0.05 vol %, 0.1 vol %, 0.5 vol %, 1 vol %, 2 vol %, 3 vol %, 4 vol %, 5 vol %, 6 vol %, 7 vol %, 8 vol %, 9 vol %, or 10 vol %. In a preferred embodiment, only one gemini cationic surfactant is included in the mixture. In a preferred embodiment, only one surfactant is included in the mixture.

In some embodiments, the gemini cationic surfactant has a critical micelle concentration (CMC) of about 10 ppm, 11 ppm, 12 ppm, 13 ppm, 14 ppm, 15 ppm, 16 ppm, 17 ppm, 18 ppm, 19 ppm to about 20 ppm. In a preferred embodiment, the gemini cationic surfactant has a critical micelle concentration of about 20 ppm. The low CMC of the surfactant reduces the amount of surfactant adsorbed onto carbonate rock surface. The surfactant of formula (II) exhibits good thermal stability at up to a temperature of 90-300° C., preferably 120-250° C., more preferably 180-220° C. In one or more embodiments, the surfactant of formula (II) is miscible in the aforementioned aqueous solution (e.g., seawater, formation water) at a temperature of 4-95° C., 10-90° C., 20-80° C., 30-60° C., or 40-50° C.

In some embodiments, the mixture further includes about 100, about 200, about 300, about 400, about 500, about 600, about 700, about 800, about 900, about 1000, about 1100, about 1200, about 1300, about 1400, about 1500, about 1600, about 1700, about 1800, about 1900, and about 2000 ppm of the methylene blue based on the total weight of the mixture. In a preferred embodiment, the mixture includes 500 ppm of methylene blue based on the total weight of the mixture.

In some embodiments, methylene blue may be substituted/may be synergistically used with any of the following cationic dyes such as azo dyes such as acid orange 5, acid orange 7, acid orange 19, acid orange 20, acid red 13, acid red 88, alcian yellow, alizarine yellow R, allura red AC, amaranth (dye), amido black 10B, aniline yellow, arylide yellow, azo violet, basic red 18, biebrich scarlet, bismarck brown Y, black 7984, brilliant black BN, brown FK, brown HT, calconcarboxylic acid, chrysoine resorcinol, citrus red 2, congo red, disperse orange 1, eriochrome black T, fast yellow AB, hydroxynaphthol blue, janus green B, lithol rubine BK, methyl orange, mordant brown 33, naphthol AS, orange GGN, oil red O, pigment yellow 10, sunset yellow FCF, trypan blue, yellow 2G; azorubine, triarylmethane dyes such as 6-carboxyfluorescein, chlorophenol red, coomassie brilliant blue, cresol red, o-cresolphthalein, crystal violet; anthraquinone dyes such as anthrapyrimidine yellow (pigment yellow 108), anthraquinoid red (pigment red 177), and indanthrone blue (pigment blue 60); and heterocyclic compounds. In a preferred embodiment, the only dye present in the mixture is methylene blue.

Methylene blue may exist in the form of circular, polygonal, triangular, and rectangular nanoparticles. In a preferred embodiment, the methylene blue is in the form of spherical nanoparticles that have an average size of about 10, about 15, about 20, about 25, about 30, about 35, about 40, and about 45 nanometers (nm). In a preferred embodiment, the methylene blue is in a form of up to about 50 nm spherical nanoparticles.

In some embodiments, methylene blue of about 0.1 mg, about 0.2 mg, about 0.3 mg, about 0.4 mg, about 0.5 mg, about 0.6 mg, about 0.7 mg, about 0.8 mg, about 0.9 mg is injected per kilogram (kg) of the carbonate rock formation. In a preferred embodiment, methylene blue of about 10 mg is injected per kg of the carbonate rock formation. Therefore, only a small amount of methylene blue is required to reduce surfactant adsorption, which is important for economic and environmental concerns.

In a preferred embodiment, the mixture does not include a base. Examples of bases include but are not limited to sodium hydroxide, sodium carbonate, sodium polyacrylate, sodium tetraborate, potassium hydroxide, and ammonia. In a preferred embodiment, the mixture does not include carbon dioxide. Carbon dioxide is known to prevent cationic surfactants from adsorbing to carbonate rocks, however, it also promotes corrosion. In some embodiments, the mixture does not corrode the carbonate rock formation. In other words, the composition and mass of the rock formation is the same following the injecting and the rock does not dissolve in the mixture.

The carbonate rock formation can be selected from rocks of sedimentary and metamorphic origin, such as limestone, chalk, marble, or dolomite, preferably, limestone and dolomite. In a preferred embodiment, the carbonate rock formation is limestone. The limestone includes sodium, magnesium, aluminum, silicon, potassium, calcium, titanium, manganese, iron, strontium, and niobium. In some embodiments, the carbonate rock formation is dolomite. The dolomite includes magnesium, aluminum, silicon, potassium, calcium, titanium, vanadium, chromium, manganese, iron, copper, strontium, and niobium. In some embodiments, the carbonate rock formation is a combination of sedimentary and metamorphic rocks. In some preferred embodiments, the carbonate rock formation is one of Guelph dolomite, Guff dolomite, Indiana limestone, or a combination thereof.

Typically, the carbonate rock formation includes varying concentrations of impurities. Such impurities include clay and minerals such as silica, flint, and quartz, which may be present in different forms. The carbonate rock formation of the present disclosure includes at least one impurity selected from the group consisting of quartz, montmorillonite, illite, kaolinite, alunite, pyrite, anorthite, halite, and gypsum. In some embodiments, the carbonate rock formation includes 0.1-50 wt. % of at least one impurity, based on the total weight of the carbonate rock formation. In some embodiments, the carbonate rock formation includes preferably about 0.1 to 1, preferably 2 to 10, preferably 11 to 20, preferably 21 to 30, preferably 31 to 40, preferably 41 to 49 wt. % of the at least one impurity, based on the total weight of the carbonate rock formation. Some impurities may also be present in traces (less than 0.1 wt. %), such as anhydrite, opal, oxides, and sulfides of iron, magnesite, fluorite, etc. In some embodiments, the carbonate rock formation includes a sandstone rock impurity. In some embodiments, the carbonate rock formation may be at least partially or fully saturated with one or more fluids, such as crude oil, an aqueous solution, another fluid, or combinations of these. In a preferred embodiment, the carbonate rock formation includes an oil composition that contains crude oil.

The impurities affect the adsorption of the surfactant on the carbonate rock formation, therefore the point of zero charge (PZC) is measured. In an embodiment, the carbonate rock formation has a PZC of 9.5 to 10. In a preferred embodiment, the pH of the mixture is below the PZC of the carbonate rock formation. In an embodiment, the pH of the mixture is less than 9.5 preferably 9.0, 8.5, 8.0, 7.5, 7.0, 6.5 or 6.0. If the solution pH is lowered below the corresponding PZC of the rock, the net positive surface charge on the adsorbent will help repel the surfactant leading to adsorption reduction.

During injecting, at least a portion of the gemini cationic surfactant is adsorbed onto the carbonate rock formation, and at least 50% less, preferably 55%, 60%, 65%, 70%, 75%, 80%, 85%, 90%, 95% or 99% less by volume of the gemini cationic surfactant adsorbs onto the carbonate rock formation compared to a method under the same conditions but without the methylene blue. In other words, the addition of the methylene blue decreases the amount of surfactant that adsorbs onto the rock formation. As the surfactant is an expensive component of the mixture it is economically important that less of the surfactant is lost in the flooding process.

Another problem associated with oil extraction from the carbonate rock formations is the low permeability of the rocks down to less than 50 mD. One of the advantages of the method of the present invention is the effects on the permeability of the carbonate rock formation. Thus, in some embodiments, following injection of the mixture, the permeability of the carbonate rock formation increases by at least 2 times, preferably 3, 4, 5, 6, 7, 8 or 9 times. For example, the permeability of a rock may increase from 50-60 mD to 400-500 mD following the injecting. In some examples, the permeability of the rocks increases by more than 5 times depending upon the amount and type of impurities present in the rocks.

Figure 1B:
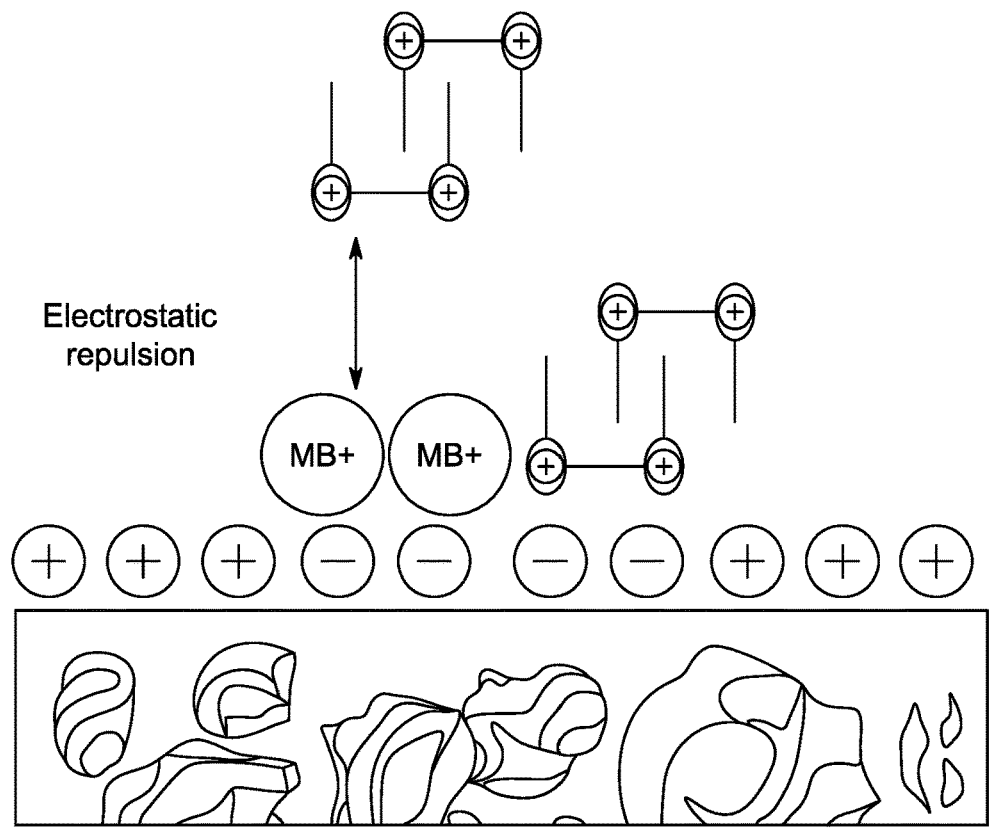

While not wishing to be bound to a single theory, it is thought that the combination of the low CMC of the surfactant and the ability of the methylene blue molecules to form a bridge between the cationic surfactant and the negative binding sites of the adsorbents, results in electrostatic repulsion and, therefore, decreases surfactant adsorption, as shown in FIGS. 1A-1B. This method of the present disclosure provides a low-cost option with a reduction in surfactant adsorption on carbonate rocks and thereby improved enhanced oil recovery.

At step 54, the method 50 includes extracting oil from the carbonate rock formation. In an embodiment. An amount of oil extracted is at least 10% greater, preferably 20%, 30%, 40%, 50%, 60%, 70%, 80%, or 90% greater than if the mixture was not injected into the rock formation. The method of recovering hydrocarbons may be performed by injecting the mixture into a first wellbore (e.g. an injection wellbore) connected to the reservoir and then collecting hydrocarbons from a second wellbore (e.g. a production wellbore) that is connected to the reservoir. Alternatively, the method may be performed by injecting the mixture into a wellbore connected to the reservoir, and then collecting hydrocarbons from the same wellbore.

EXAMPLES

The following examples demonstrate a method of enhanced oil recovery in a carbonate rock formation as described herein. The examples are provided solely for illustration and are not to be construed as limitations of the present disclosure, as many variations thereof are possible without departing from the spirit and scope of the present disclosure.

Example 1: Materials

Figure 11:
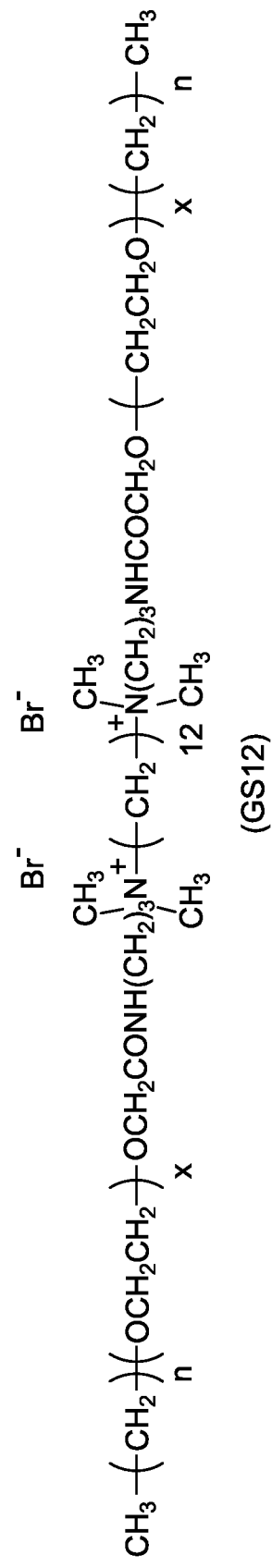
FIG. 11 depicts GS12, according to certain embodiments.

The adsorbate studied in this research is a synthesized cationic gemini surfactant (GS12) depicted in FIG. 11. The spacer length is C12, and the hydrophobic tail is also C12, hence it's a Dec. 12, 2012 gemini surfactant. This surfactant is tolerant to high temperature and high salinity (HTHS) environments because of the appropriate positioning of ethoxy units between the hydrophilic head and hydrophobic tail units and it has a low critical micelle concentration (CMC) ~$8.26 \times 10^{-6}$ mol/L (15.5 ppm). Methylene blue is a low-cost cationic dye that can be obtained from the textile industry.

Example 2: Surfactant Adsorption

Figure 3:
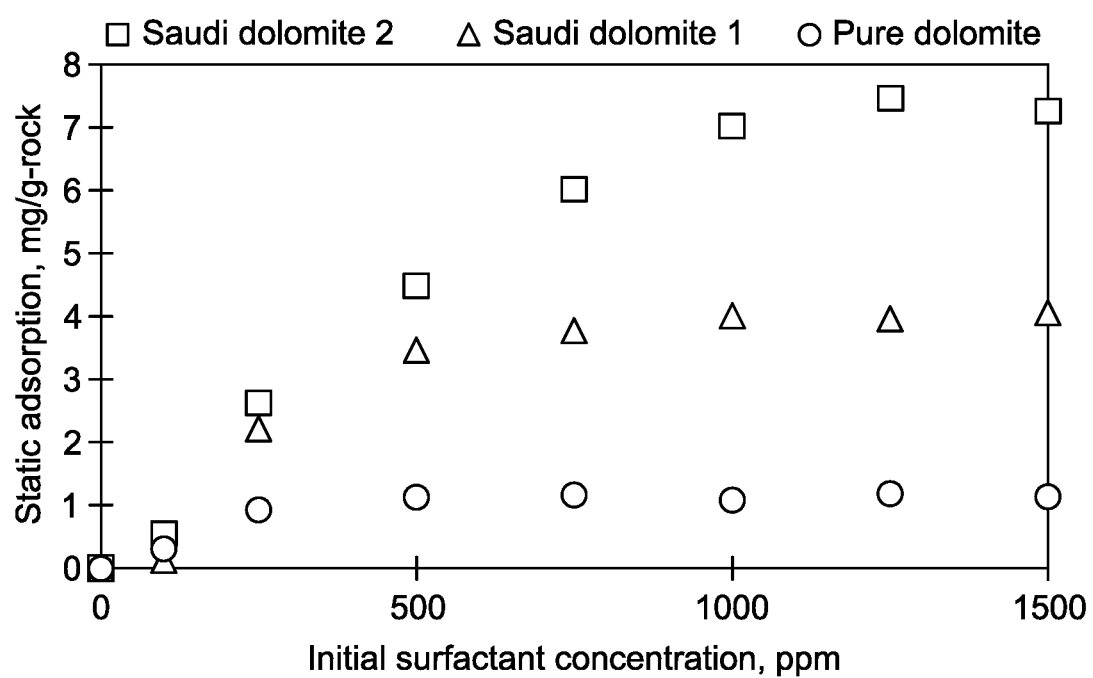
FIG. 3 depicts static adsorption of cationic gemini surfactant (GS12) on adsorbents, Saudi dolomite 1, Saudi dolomite 2, and pure dolomite, according to certain embodiments.

Results of static adsorption experiments of GS12 on pure dolomite and two Saudi dolomite outcrops (Saudi dolomite 1 and Saudi dolomite 2) are shown in FIG. 3. The adsorption on all rock samples increased with increasing surfactant concentration. For pure dolomite, the adsorption increased gradually with increased surfactant concentration up to 500 ppm and reached a plateau at around 1 mg surfactant/g of rock. However, Saudi dolomites 1 and 2 attain the adsorption plateau at 1000 ppm surfactant concentration. The adsorption plateau values for Saudi dolomites 1 and 2 were ~4 and ~7 mg/g-rock, respectively. GS12 adsorption on Saudi dolomite 1 was higher than that of pure dolomite. This can be attributed to quartz (2.8%) and montmorillonite (0.1%) in Saudi dolomite 1. Quartz and montmorillonite increase the number of negative binding sites, allowing more cationic GS12 molecules to adsorb on the rock surface. Saudi dolomite 2 contains more impurities (quartz=17.3%, montmorillonite=0.3%) than Saudi dolomite 1 and, therefore, showed higher GS12 adsorption. A higher degree of cationic surfactant adsorption may result if the carbonate rock contains even a small quantity of silicate and/or clay minerals. Also, the degree of adsorption will increase as the percentage of silicate and/or clay minerals increases.

Example 3: Effect of Minerals on Adsorption

Figure 4A:
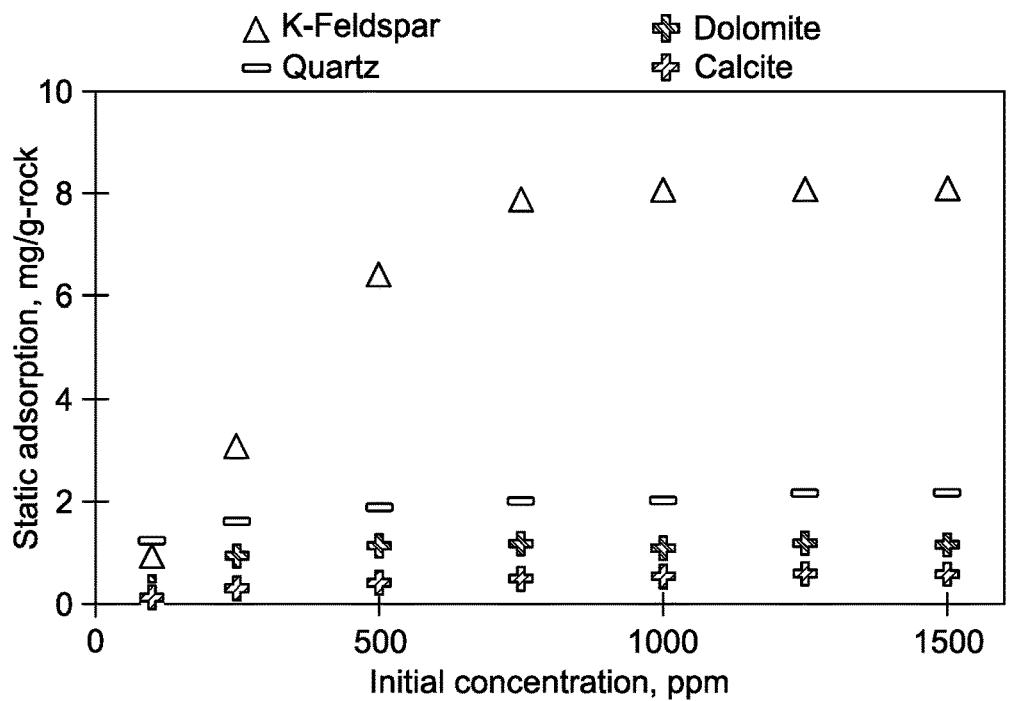
FIG. 4A depicts surfactant adsorption isotherms for non-clay minerals, according to certain embodiments.
Figure 4B:
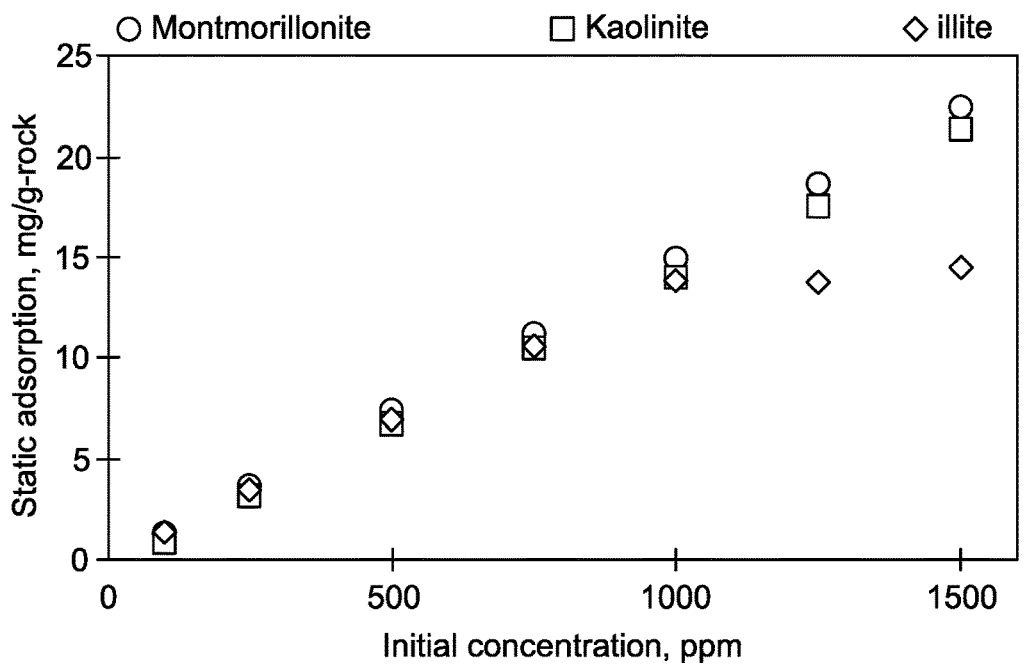
FIG. 4B depicts surfactant adsorption isotherms for clay minerals, according to certain embodiments.

FIG. 4A-FIG. 4B presents the adsorption isotherms of GS12 on both clay and non-clay minerals. In the case of non-clay minerals (FIG. 4A), the adsorption of GS12 on carbonate minerals (calcite and dolomite) was the lowest. This is due to the lower density of net negative charge. The adsorption of GS12 on silicate minerals was higher, with K-feldspar showing higher adsorption than quartz and other carbonate minerals. Adsorption increased gradually on calcite, dolomite, and quartz surfaces until a 1000 ppm surfactant concentration and then leveled off, exhibiting the adsorption plateau. On the other hand, the adsorption of GS12 on K-feldspar increased sharply up to 1000 ppm, and then the adsorption plateau was observed. The GS12 adsorption plateau values for calcite, dolomite, quartz, and K-feldspar were 0.58, 1.14, 2.16, and 8.11 mg/g-rock, respectively.

This shows that small quantities of silicate minerals (K-feldspar and quartz) in a carbonate reservoir rock can cause GS12 adsorption.

FIG. 4B illustrates the adsorption behavior of GS12 on the three most common clay minerals (montmorillonite, kaolinite, and Illite), where the surfactant adsorbs on the negative sites of these minerals. The adsorption plateau was observed on montmorillonite and kaolinite when a surfactant concentration of 1500 ppm (~100 times CMC) was reached. However, Illite exhibited an adsorption plateau at 1000 ppm surfactant concentration. The amount of GS12 adsorption at 1500 ppm on those minerals was in the order of montmorillonite>kaolinite>Illite. Hence, a small quantity of any of the three clay minerals in reservoir rock will result in GS12 adsorption.

Example 4: Effect of Salinity on Adsorption

Most standard EOR surfactants perform poorly in a high-saline environment, often indicating precipitation upon adding $Ca^{2+}$ and $Mg^{2+}$ to the solutions. The results of tests conducted on GS12 are presented in FIGS. 5A-5D. No solubility challenges were seen in these tests, even when the $CaCl_2$ and $MgCl_2$ concentrations were as high as 146,900 ppm (1 molar (M)) and 203,200 ppm (1M), respectively.

Figure 5A:
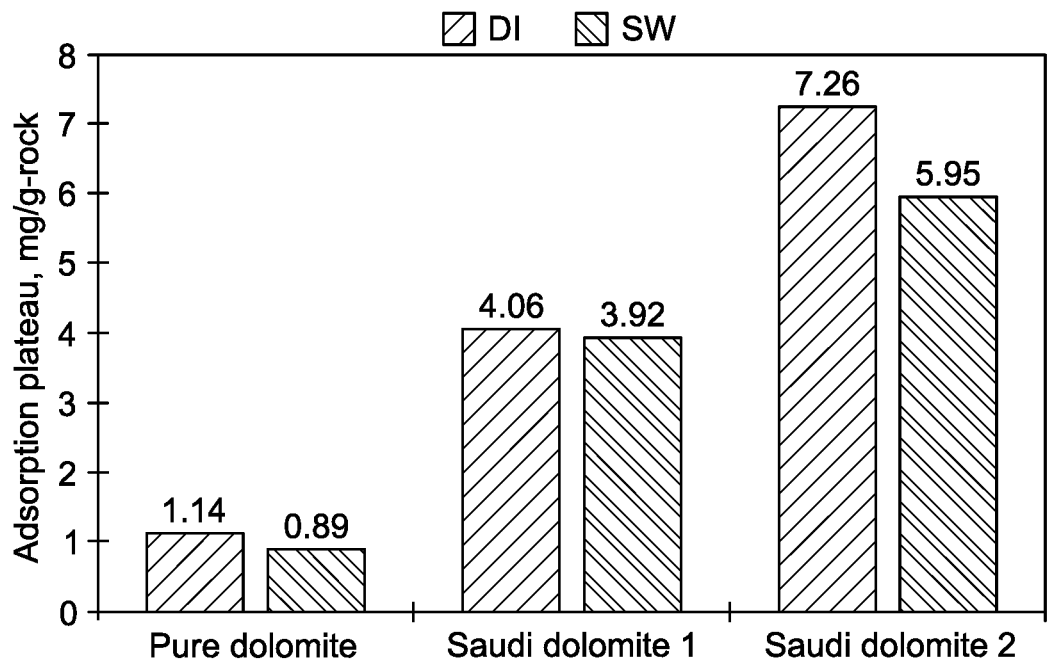
FIG. 5A depicts the impact of seawater on static adsorption of 1500 parts per million (ppm) GS12 on pure dolomite, Saudi dolomite 1, and Saudi dolomite 2, according to certain embodiments.

FIG. 5A presents the impact of seawater on the static adsorption of GS12 on pure dolomite, Saudi dolomite 1, and Saudi dolomite 2. Adsorption was found to decrease for all adsorbents in comparison with that in deionized water. Since seawater contains several monovalent and multivalent salts, the effect of individual salts on the adsorption of surfactant on dolomite rocks is important.

Figure 5B:
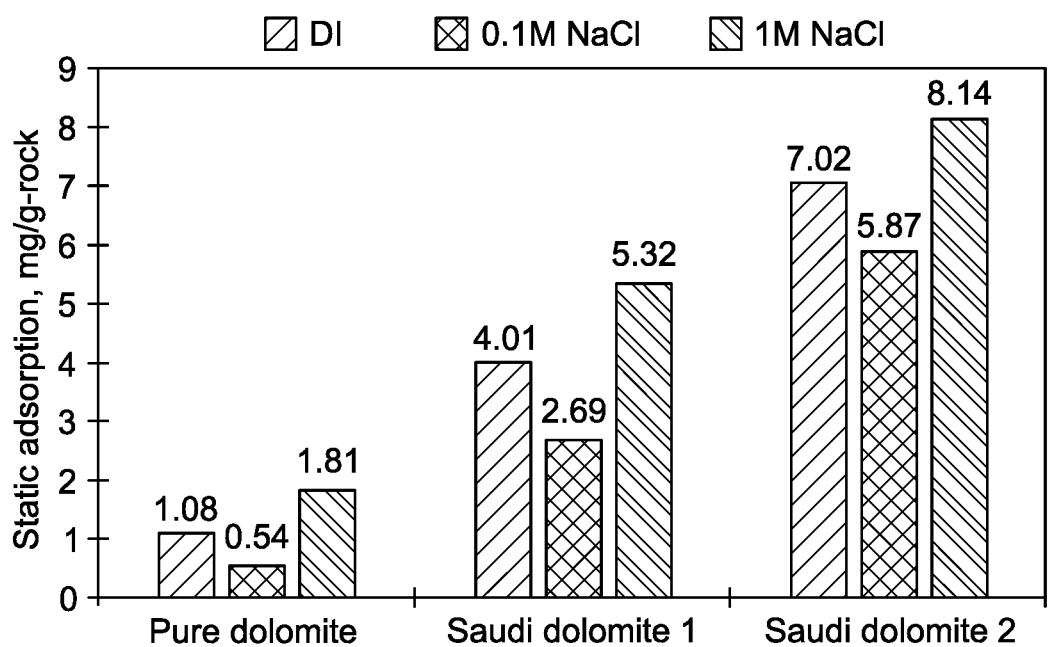
FIG. 5B depicts effect of NaCl concentration on static adsorption of 1000 parts per million (ppm) GS12 on pure dolomite, Saudi dolomite 1, and Saudi dolomite 2, according to certain embodiments.

FIG. 5B shows the effect of NaCl (a monovalent salt) at 1000 ppm GS12 concentration. Both low salinity (5845 ppm or 0.1M) and high salinity (58,450 ppm or 1M) tests were conducted. The trend in FIG. 5B is explained by the electric double layer at the adsorbent and adsorbate interface, created by the unequal distribution of electrical charges. The electric double layer between microparticles on the rock surface is expanded at low salinity conditions. Such expansion lowers the interfacial energy between fluid and rock, reducing surfactant adsorption on the rock surface. This mechanism was observed for all studied rocks, as shown in FIG. 5B. However, the addition of a higher concentration of NaCl (58,450 ppm) increases the surfactant adsorption on all rock samples. With the increase of the concentration of NaCl, the electrical double layer on the surface of the adsorbent is assumed to be compressed.

Figure 5C:
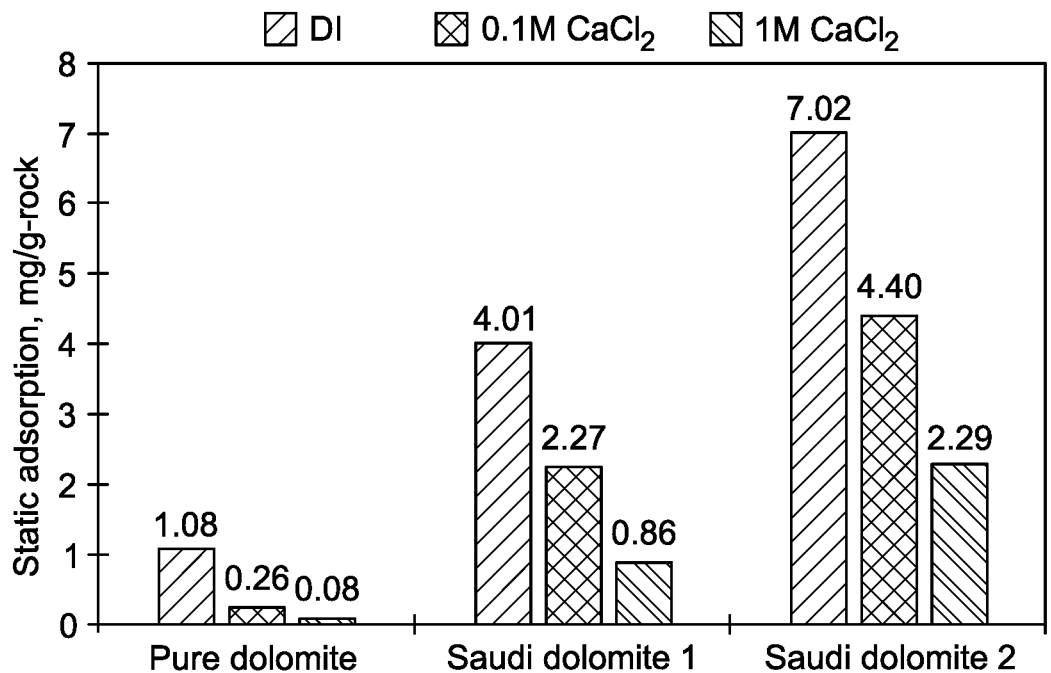
FIG. 5C depicts effect of $CaCl_2$ concentration on static adsorption of 1000 parts per million (ppm) GS12 on pure dolomite, Saudi dolomite 1, and Saudi dolomite 2, according to certain embodiments.
Figure 5D:
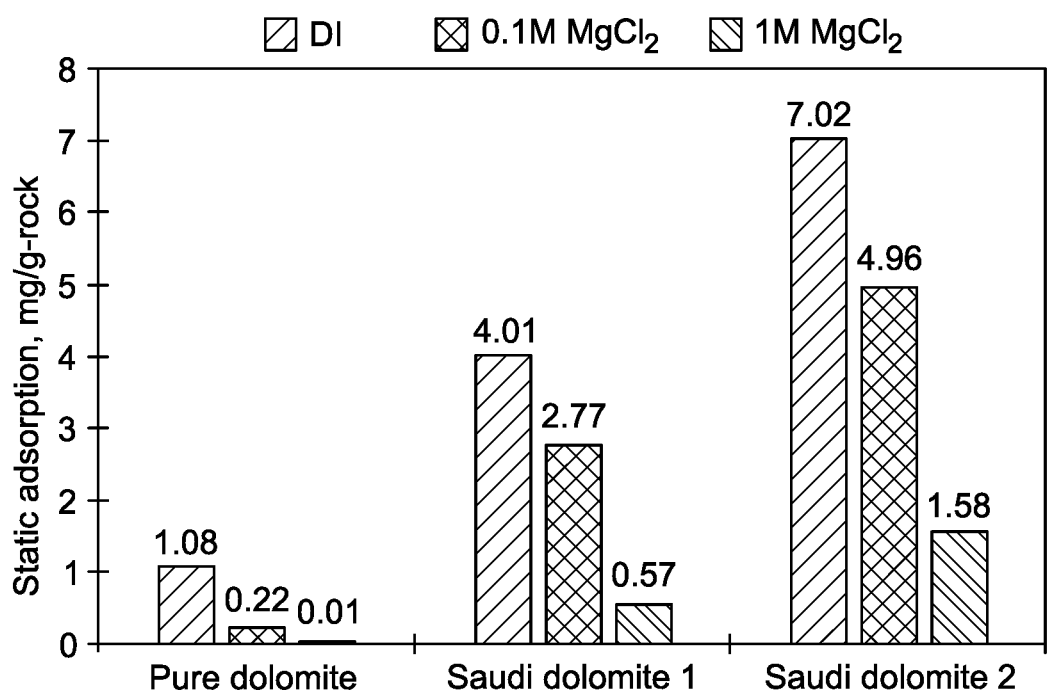
FIG. 5D depicts effect of $MgCl_2$ concentration on static adsorption of 1000 parts per million (ppm) GS12 on pure dolomite, Saudi dolomite 1, and Saudi dolomite 2, according to certain embodiments.

Therefore, the repulsive forces between the surfactant and the rock reduce, increasing surfactant adsorption. On the other hand, adding divalent salts ($CaCl_2$ and $MgCl_2$) reduced surfactant adsorption for all adsorbents, as shown in FIGS. 5C and 5D. The higher the concentration of divalent salts in the surfactant solution, the more reduction of adsorption takes place. This may be due to the increased rock surface charge by lattice ions ($Ca^{2+}$ and $Mg^{2+}$). The zeta potential was positive for dolomite suspended in an aqueous solution containing $CaCl_2$ and $MgCl_2$—consequently, repulsive forces between the surfactant and the rock surface increase, leading to adsorption reduction. The adsorption value was reduced to 0.08 mg/g-rock and 0.01 mg/g-rock in the case of pure dolomite by adding 1M $CaCl_2$ (146,900 ppm) and 1M $MgCl_2$ (203,200 ppm) in 1000 ppm GS12 surfactant solution, respectively.

Example 5: Methylene Blue as an Adsorption Inhibitor

Firstly, a Saudi dolomite outcrop taken from the Al-Lidam escarpment area of the Eastern Province of Saudi Arabia, which contains a large number of impurities (silicate and clay minerals), was tested with a 100-ppm aqueous solution of MB without surfactant. The test showed adsorption of MB on the rock, which suggested that adding MB to the GS12 solution may help reduce the surfactant's adsorption on this and similar carbonate rocks.

Figure 6:
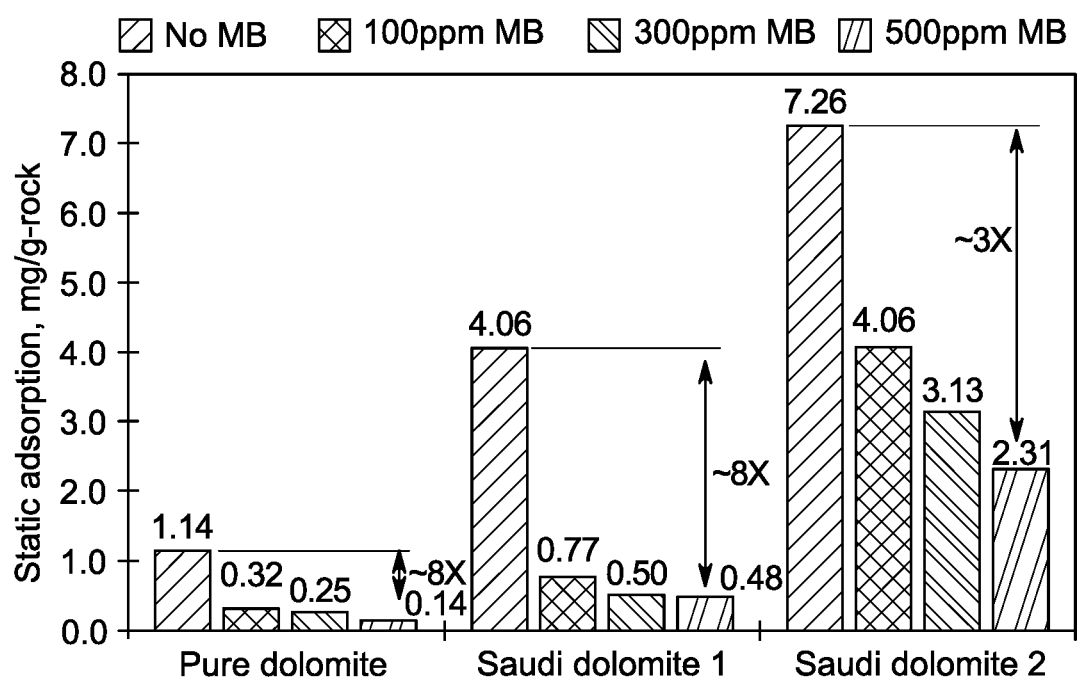
FIG. 6 depicts adsorption reduction on the adsorbents such as Saudi dolomite 1, Saudi dolomite 2, and pure dolomite using methylene blue at 1500 ppm initial surfactant concentration, according to certain embodiments.

Adsorption experiments were conducted at 1500 ppm GS12 concentration by adding MB on different adsorbents. The MB concentration varied between 100 ppm to 500 ppm. The results (FIG. 6) showed a reduction in surfactant adsorption by a small addition of MB. GS12 adsorption on pure dolomite, Saudi dolomite 1, and Saudi dolomite 2 was reduced to 0.32 mg/g-rock, 0.77 mg/g-rock, and 4.06 mg/g-rock by the addition of only 100 ppm MB to the surfactant solution. Adsorption of GS12 was further reduced by increasing the MB concentration to 300 ppm and 500 ppm. For Saudi dolomite 2, the adsorption was decreased to 2.31 mg/g-rock with 500 ppm MB. However, since the adsorption was already low, a negligible decrease in adsorption was observed with pure dolomite and Saudi dolomite 1. This suggests that a larger concentration of MB may be required for a carbonate rock with a very large content of silicate and clay minerals. As illustrated in FIG. 6, the maximum surfactant adsorption reduction using 500 ppm MB was 8 times for pure dolomite and Saudi dolomite 1, and 3 times for Saudi dolomite 2.

Figure 7:
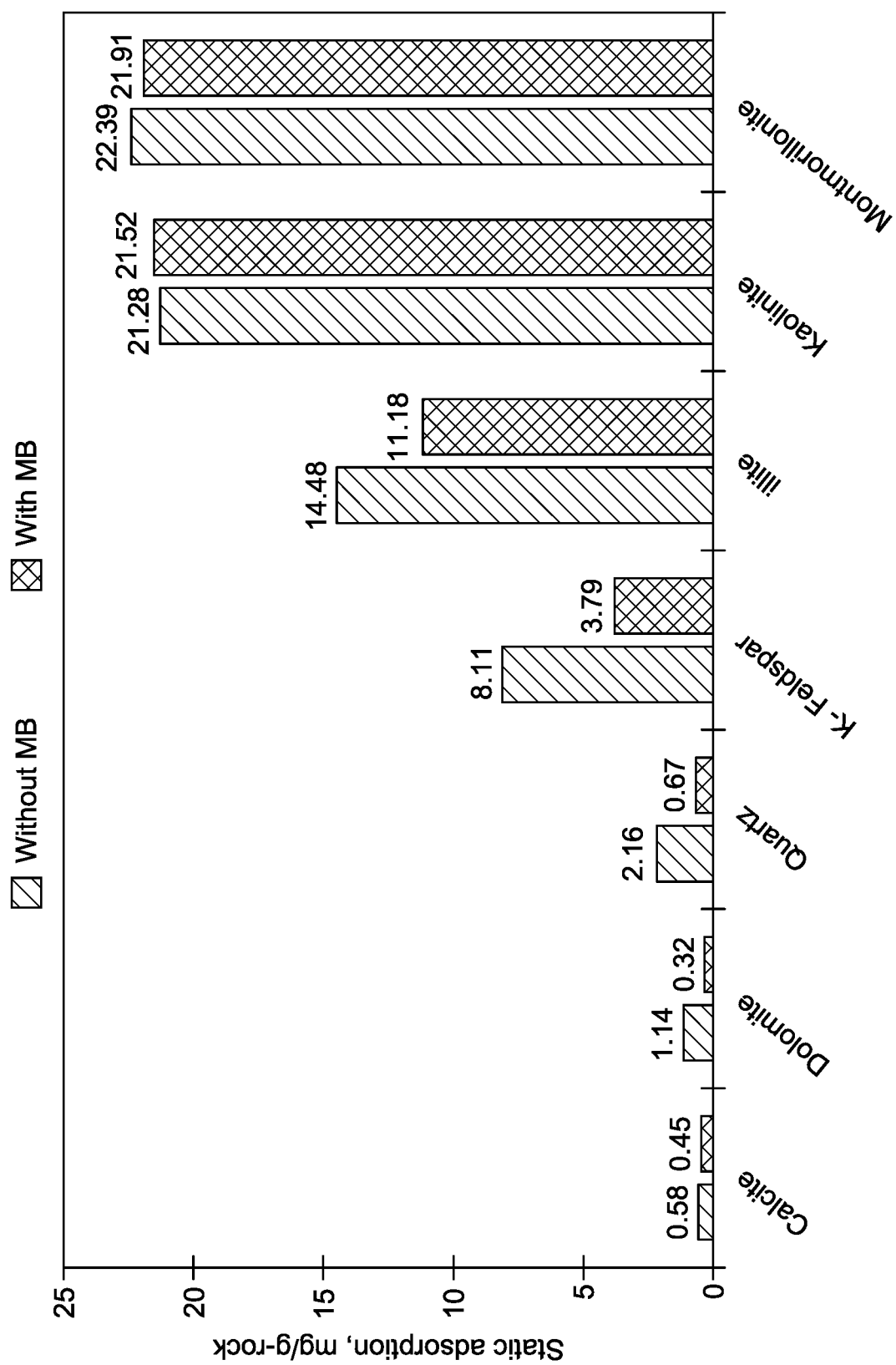
FIG. 7 depicts an application of methylene blue (100 ppm) as an adsorption inhibitor for several minerals, according to certain embodiments.

Tests were also conducted on pure dolomite, calcite, and quartz samples in which 100 ppm of MB was added to GS12 solutions of 1500 ppm concentration. Results show that surfactant adsorption reduced to 0.32, 0.45, and 0.67 mg/g-rock in dolomite, calcite, and quartz, respectively, as shown in FIG. 7. This indicates that if natural dolomite or limestone rocks contain impurities of quartz, adsorption of GS12 can be reduced with MB. Using MB also reduced GS12 adsorption) in K-feldspar and Illite. However, a negligible reduction was seen with montmorillonite and kaolinite. Past studies show that montmorillonite and kaolinite have a high affinity toward MB. Therefore, larger quantities of MB may be required to adsorb on those clay minerals to reduce GS12 adsorption.

Figure 8:
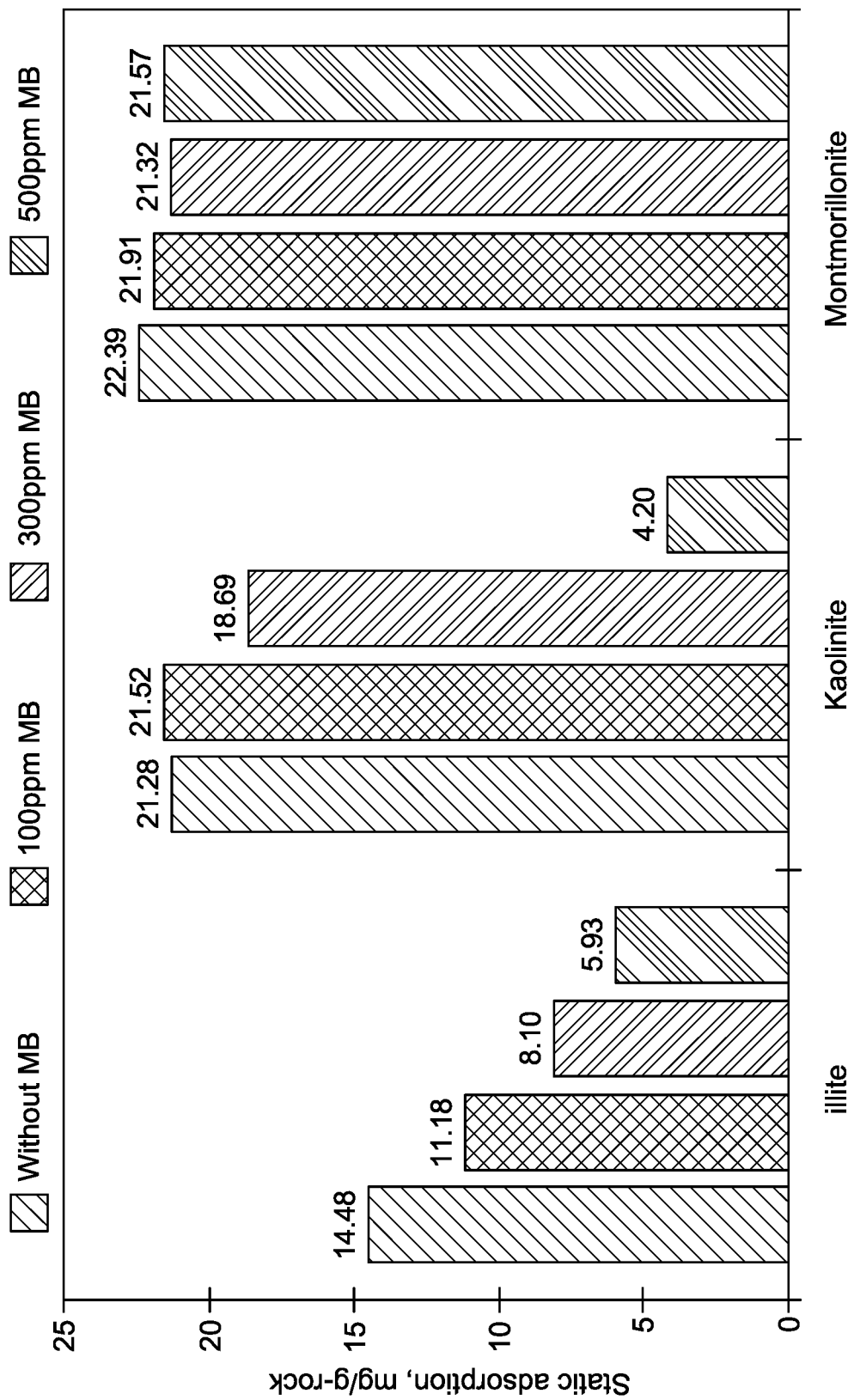
FIG. 8 depicts the effect of GS12 (1500 ppm) adsorption reduction in clay minerals, at different concentrations of methylene blue, according to certain embodiments.

Other MB concentrations were tested as well. FIG. 8 shows adsorption reduction on clay minerals with 1500 ppm GS12 solution at different MB concentrations. Adsorption was reduced by 59.05% and 80.26% on Illite and kaolinite, respectively, using 500 ppm MB. However, a larger concentration of MB may be required for montmorillonite. Additional static adsorption tests on the clay minerals (Illite, kaolinite, and montmorillonite) and a Saudi outcrop #2 at different concentrations of methylene blue (750 ppm and 1000 ppm) and a fixed concentration of GS12 (1500 ppm) were also conducted. A wide range of methylene blue concentrations was obtained from 0 ppm to 1000 ppm. It was found that GS12 surfactant adsorption was high in the presence of clay minerals. Hence, clay minerals and Saudi outcrop #2 (containing the highest degree of impurities among all studied carbonate outcrops) were selected to run additional adsorption tests.

Figure 9:
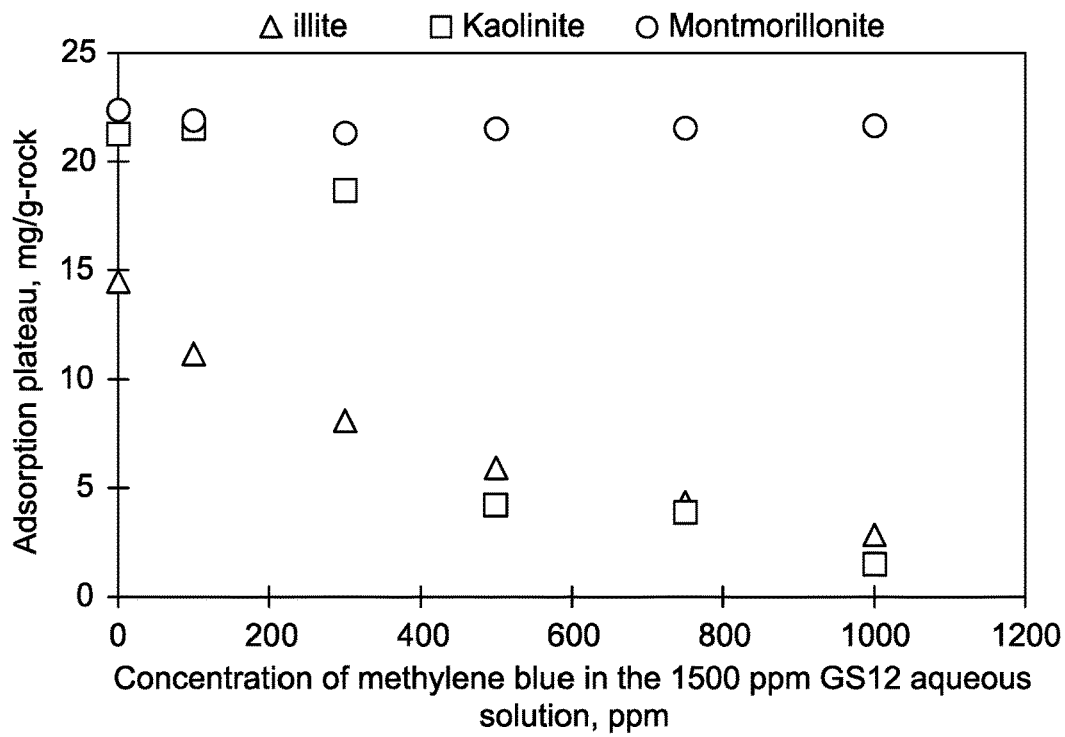
FIG. 9 depicts effect of methylene blue concentration on the adsorption reduction of GS12 on clay minerals, according to certain embodiments.

FIG. 9 shows the effect of methylene blue concentration on the adsorption reduction of GS12 on clay minerals. Adding methylene blue in the aqueous solution of a cationic gemini surfactant reduces surfactant adsorption on Illite and kaolinite. However, this is different in the case of montmorillonite. The possible reasoning is that montmorillonite is a swelling clay. The swelling behavior of montmorillonite is attributed to its ability to incorporate water molecules between its layers. Increasing the concentration of methylene blue further reduces surfactant adsorption on Illite and kaolinite. However, beyond 500 ppm methylene blue concentration, there is a slight decrease in surfactant adsorption on Illite and kaolinite.

Figure 10:
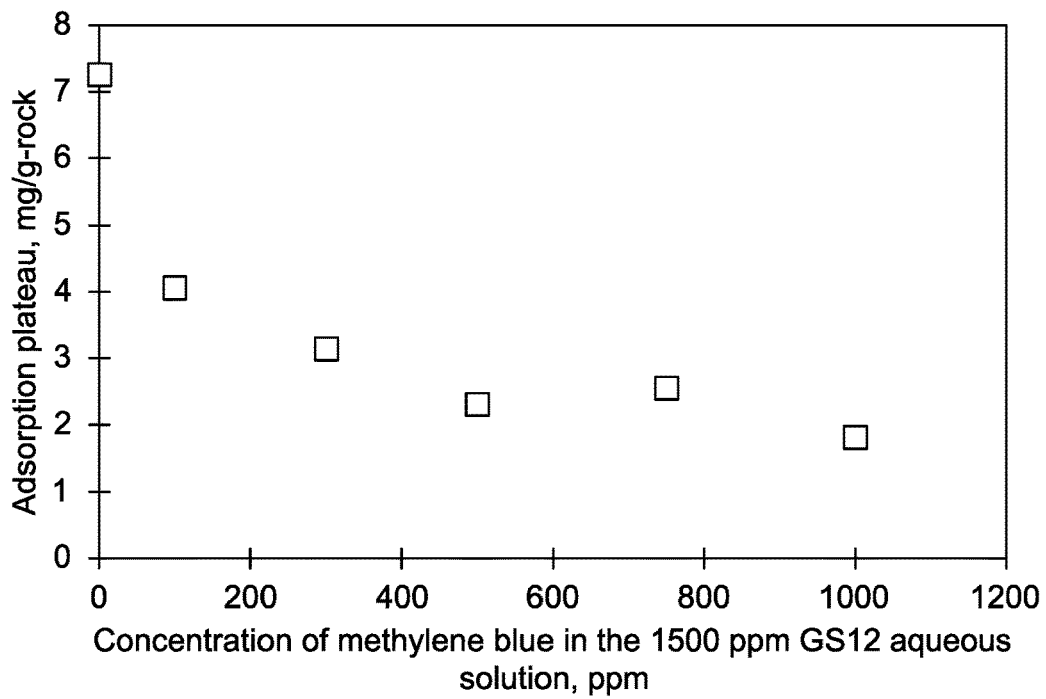
FIG. 10 depicts effect of methylene blue concentration on the adsorption reduction of GS12 on a Saudi carbonate #2, according to certain embodiments.

FIG. 10 illustrates the effect of methylene blue concentration on the adsorption reduction of GS12 on a Saudi carbonate #2. Increasing the concentration of methylene blue further reduces surfactant adsorption on Saudi carbonate #2. However, unexpectedly beyond 500 ppm methylene blue concentration, the decrease in surfactant adsorption was found negligible.

In the present disclosure, the method of enhanced oil recovery in the carbonate rock formation includes methylene blue, which has several advantages, such as a smaller quantity of methylene blue is required to reduce the adsorption of a cationic surfactant on carbonate rocks and methylene blue is cheap and widely available as chemical waste in the textile industry. Therefore, adding methylene blue to the surfactant solution will be highly cost-effective. Furthermore, adding methylene blue to the surfactant solution will not cause corrosion problems to the facilities and equipment.

Numerous modifications and variations of the present disclosure are possible in light of the above teachings. It is therefore to be understood that within the scope of the appended claims, the invention may be practiced otherwise than as specifically described herein.

The invention claimed is:

1. A method of enhanced oil recovery in a carbonate rock formation, comprising:
   injecting a mixture into the carbonate rock formation comprising an oil composition; and
   extracting the oil composition from the carbonate rock formation,
   wherein the mixture comprises:
   90-99.99 vol % of an aqueous solution and 0.01-10 vol % of a gemini cationic surfactant based on a total volume of the mixture; and
   300-2000 parts per million (ppm) of methylene blue, based on a total weight of the mixture,
   wherein during the injecting at least a portion of the gemini cationic surfactant is adsorbed onto the carbonate rock formation,
   wherein at least 50% less by volume of the gemini cationic surfactant adsorbs onto the carbonate rock formation compared to a method under the same conditions but without the methylene blue, and
   wherein molecules of the methylene blue form a bridge between the gemini cationic surfactant and negative binding sites of the carbonate rock formation to decrease an adsorption of the gemini cationic surfactant to the carbonate rock formation.

2. The method of claim 1, wherein the carbonate rock formation is at least one selected from the group consisting of limestone and dolomite.

3. The method of claim 1, wherein the carbonate rock formation is limestone and comprises sodium, magnesium, aluminum, silicon, potassium, calcium, titanium, manganese, iron, strontium, and niobium.

4. The method of claim 1, wherein the carbonate rock formation is dolomite and comprises magnesium, aluminum, silicon, potassium, calcium, titanium, vanadium, chromium, manganese, iron, copper, strontium, and niobium.

5. The method of claim 1, wherein the carbonate rock formation further comprises at least one impurity selected from the group consisting of quartz, montmorillonite, illite, kaolinite, alunite, pyrite, anorthite, halite, and gypsum.

6. The method of claim 5, wherein the carbonate rock formation comprises 0.1-50 wt. % of the at least one impurity, based on a total weight of the carbonate rock formation.

7. The method of claim 1, wherein the aqueous solution comprises least one ion selected from the group consisting of chloride, sodium, sulfate, magnesium, calcium, and potassium.

8. The method of claim 7, wherein the aqueous solution comprises 1-200,000 ppm of the at least one ion, based on a total mass of the aqueous solution.

9. The method of claim 1, wherein the mixture has a temperature ranging from 70 to 110° C. during the injecting.

10. The method of claim 1, wherein the mixture consists of the aqueous solution, the gemini cationic surfactant, and methylene blue.

11. The method of claim 1, wherein the gemini cationic surfactant is of formula (II)

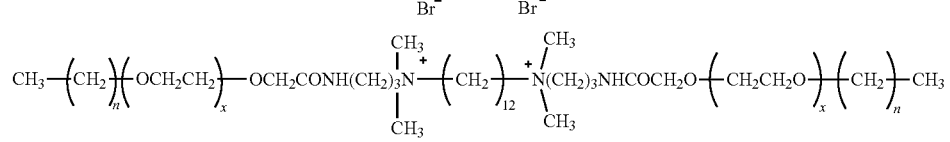

wherein n is 1 to 20 and x is 1 to 20.

12. The method of claim 11, wherein n is 12 and x is 12.

13. The method of claim 1, wherein the gemini cationic surfactant has a critical micelle concentration of 10-20 ppm.

14. The method of claim 1, wherein 0.1-10 milligrams (mg) of methylene blue is injected per kilogram (kg) of the carbonate rock formation.

15. The method of claim 1, wherein the mixture does not comprise a base.

16. The method of claim 1, wherein the mixture does not corrode the carbonate rock formation.

17. The method of claim 1, wherein the methylene blue is in a form of spherical nanoparticles have an average size of 10-50 nanometers (nm).

18. The method of claim 1, wherein a permeability of the carbonate rock formation increases by more than 5 times upon the injecting of the mixture into the carbonate rock formation, relative to not injecting the mixture.

\* \* \* \* \*